United States Patent
Franklin et al.

(10) Patent No.: US 7,092,364 B1
(45) Date of Patent: Aug. 15, 2006

(54) SYSTEM AND METHOD FOR MONITORING DSL SERVICE PROVISIONING

(75) Inventors: Kenneth D. Franklin, Cumming, GA (US); Robert J. Bates, Cumming, GA (US); Frederick Edwards, Ellen Wood, GA (US); Noland Smith, Lithonia, GA (US); Klaudio Kucelin, Atlanta, GA (US); Joel E. Cordsmeyer, Tucker, GA (US); Noris C. Tsangarides, Lawrenceville, GA (US); Angel Rodriguez, Lithonia, GA (US); Steven Dominie, Lawrenceville, GA (US); Jean-Pierre Zaiter, Dacula, GA (US); Zhao Ming Li, Norcross, GA (US); Michael Hebert, Lawrenceville, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 893 days.

(21) Appl. No.: 10/040,677

(22) Filed: Dec. 28, 2001

(51) Int. Cl.
*H04L 12/26* (2006.01)

(52) U.S. Cl. .................... 370/252; 370/493
(58) Field of Classification Search .............. 370/493, 370/494, 495, 252
See application file for complete search history.

(56) References Cited

U.S. PATENT DOCUMENTS

| 6,819,746 B1 * | 11/2004 | Schneider et al. ....... 379/29.01 |
| 2005/0163287 A1 * | 7/2005 | Ouyang et al. ................ 379/3 |
| 2005/0169315 A1 * | 8/2005 | Jiang et al. ................ 370/493 |

OTHER PUBLICATIONS

R. Rong et al., 'Web-based expert system for automated DSL loop qualification', Network Operations and Management Symposium, Apr. 2000, pp. 201-214.*

E. Eichen et al., 'DSTS: An expert system for diagnosis of advanced digital subscriber services', Network Operations and Management Symposium, Feb. 1998, vol. 3, pp. 795-804.*

(Continued)

*Primary Examiner*—Melvin Marcelo
(74) *Attorney, Agent, or Firm*—Potomac Patent Group PLLC

(57) ABSTRACT

A system for automatically monitoring provisioning in a DSL network is disclosed. The system is operable to query network elements in the DSL network for information related to the provisioning of DSL services. Thereafter, the system analyzes the information to identify points of delay and/or failure in the provisioning process. If a delay exceeds a threshold value, an administrator is notified.

23 Claims, 8 Drawing Sheets

OTHER PUBLICATIONS

Alcatel 7300, ASAM DSL Subscriber Access Platform and ASAM DSL Remote Access Platform, http://www.cid.alcatel.com/doctypes/product/html/a7300asam.jhtml, one page, printed on Aug. 27, 2001.

Alcatel 7300, Asymmetric DSL (ADSL) Line Card for Analog POTS (ETSI Version), http://www.cid.alcatel.com/doctypes/productdescriptionapplication/html/a7300pots.jhtml, pp. 1-3, printed on Aug. 27, 2001.

Alcatel 7300, Asymmetric DSL (ADSL) Line Card for ISDN (ETSI Version), http://www.cid.alcatel.com/doctypes/productdescriptionapplication/html/a7300isdn.jhtml, pp. 1-2, printed on Aug. 27, 2001.

Alcatel 7300, SHDSL Line Card (ESTI Version), http://www.cid.alcatel.com/doctypes/productdescriptionapplication/html/a7300hdsl.jhtml, pp. 1-3, printed on Aug. 27, 2001.

Technical Paper: "The Universal DSLAM Concept—Broadening the Service Scope with a Single, Scalable, Cost-Effective platform," Alcatel, pp. 1-6, Jul. 2001.

* cited by examiner

Fig. 5B

TN Navis Activity Details

[1 - 10] of [95]

| TN | Type | Date | Start Time | End Time | Navis U1 | Navis Time | Error Message |
|---|---|---|---|---|---|---|---|
| 919-859-8121 | Delete | 11/30/2001 | 09:58:12 | 10:08:16 | navis-ux8 | 11 secs | Expired time 604 secs at 10:08:16 |
| 919-859-8121 | Delete | 11/30/2001 | 10:08:58 | 10:18:06 | navis-ux8 | 12 secs | Failed to disconnect DSLAM cross connect |
| 919-365-3961 | Add | 11/30/2001 | 10:09:12 | 10:09:38 | navis-ux8 | 14 secs | succeeded!! |
| 706-227-9858 | Delete | 11/30/2001 | 10:17:20 | 10:18:16 | navis-ux9 | 13 secs | succeeded!! |
| 919-968-3667 | Add | 11/30/2001 | 10:17:20 | 10:17:49 | navis-ux8 | 15 secs | succeeded!! |
| 706-227-9858 | Add | 11/30/2001 | 10:17:46 | 10:18:16 | navis-ux9 | 6 secs | succeeded!! |
| 337-981-3969 | Delete | 11/30/2001 | 10:18:24 | 10:18:50 | navis-ux6 | 11 secs | Failed to disconnect ATM cross connect |
| 337-392-9645 | Delete | 11/30/2001 | 10:18:43 | 10:18:56 | navis-ux6 | 6 secs | |
| 706-354-8068 | Delete | 11/30/2001 | 10:19:05 | 10:19:23 | navis-ux9 | 10 secs | succeeded!! |
| 386-615-0613 | Delete | 11/30/2001 | 10:19:50 | 10:20:11 | navis-ux8 | 11 secs | succeeded!! |

Next | Last | Done | Print

SYSTEM AND METHOD FOR MONITORING DSL SERVICE PROVISIONING

FIELD OF THE INVENTION

The present invention relates generally to telecommunications systems, and more particularly, to systems and methods for managing resources in a broadband network.

BACKGROUND OF THE INVENTION

Demand for in-home data and telephony services has grown dramatically in recent years and is expected to continue to increase. Accordingly, providers of data and telephony services have sought to design and deploy broadband networks with increased delivery capacity.

One broadband technology that has become particularly popular is digital subscriber lines (DSL). DSL offers increased data transfer rates and integrated telephony and data services using the existing public switched telephone network (PSTN), which previously was used exclusively for telephone voice communications.

As the demand for DSL service has grown, service providers have needed to build-out their infrastructure for providing DSL service. In particular, service providers have needed to quickly install large numbers of network elements devoted to providing DSL service. For example, service providers have needed to install large numbers of digital subscriber line multiplexors (DSLAM's), remote access multiplexors (MiniRAMs), subtending, element management systems (EMS's), as well as other network elements, in a geographically distributed network. Installing, managing, and administering these quickly expanding, geographically distributed DSL networks has become increasing complex, time consuming, and expensive.

One aspect of DSL network maintenance that has proven particularly cumbersome is provisioning of DSL services. Generally, in order to provide DSL service to a customer, numerous DSL network elements need to be configured so as to create a communication path, which may be referred to as a permanent virtual circuit (PVC), from the customer through the DSL network to an Internet service provider (ISP). The process of routing an order for DSL service and configuring the network elements to create the PVC is often referred to as "provisioning."

Generally, DSL provisioning involves routing a DSL service request through a series of administrative systems until the request is forwarded to a network management system (NMS), which controls the configuration of network elements for creating PVCs and/or a tunnel through the DSL network to an ISP/NSP. The NMS determines which network elements, cards, ports and logical assignments need to be configured for creation of the PVC/tunnel and cross connects at the multiplexors. It routes requests to one or more element management systems (EMS's), and sometime directly to the network element to implement the configurations. The EMS's in turn communicate with network elements for example, DSLAM's, miniRAM's, ATM switches, IP routers and switches to implement connectivity from the customer through the DSL network elements to an ISP/NSP.

Thus, the provisioning process may involve routing a request for service through numerous computerized administrative systems, configuring numerous DSL network elements to establish a PVC from the end user to an ATM network, and configuring still more network elements to complete the PVC through an ATM/IP network to an ISP/NSP. Optimally, the provisioning process, from the time the order is received until the time the service is activated, takes from 20 seconds to a couple of minutes.

Of course, there are often delays and failures in the provisioning process. Quickly identifying points of failure is essential for the smooth operation of the DSL network and to meet customer expectations. Also, these backups can drive upstream systems into overload and excessive processing which can have a ripple effect in the IT space. In existing DSL networks, such troubleshooting activities are performed manually by technicians using spreadsheets or logging into servers.

Applicants have noted that relying on technicians to manually troubleshoot DSL provisioning is slow, costly, inefficient, and prone to human error. Such inefficiencies may be tolerable when only a small number of lines need provisioning, but quickly become unsatisfactory when, as is now the situation, thousands of DSL lines are ordered on a daily basis.

Accordingly, Applicants have recognized a need in the art for automated systems and methods for monitoring DSL provisioning.

SUMMARY OF THE INVENTION

The present invention meets these and other needs in the art.

Applicants have invented systems and methods for automated troubleshooting of DSL provisioning. The disclosed systems and methods are operable to monitor the provisioning of DSL services by gathering data from the EMS's, NMS and network elements, generate reports regarding provisioning, and when an unacceptable delay is detected in the provisioning process, generate an alert. A computing system, which may be referred to as a provisioning monitoring tool (PMT), queries the NMS, EMS's and network elements in the DSL network that are either configured during the provisioning process or are responsible for managing the provisioning process. The machines that are queried may include, for example, the network management system (NMS), element management systems (EMS's), digital subscriber line multiplexors (DSLAM's), remote multiplexors, IP routers/switches and ATM switches. Notable among the items for which the PMT queries is the length of time associated with performing provisioning related tasks at each network element.

Using the query results, the PMT can display data on a GUI interface and generate reports concerning the provisioning process. For example, the PMT can trace the provisioning of individual DSL service requests, which are usually identified by the DSL phone number that is being provisioned, from the time the request was entered into the system through to when the provisioning process was completed. If the time associated with provisioning at one of the network elements exceeds a prescribed period, the PMT indicates this in the report. Indeed, when a threshold period for provisioning is exceeded, a notification alert is sent to a designated administrator who may then investigate the delay. The reports may show aggregated provisioning information and/or information for a single service request. For example, reports are provided showing average provisioning times, average provisioning times at particular network elements, and average provisioning times between elements in the provisioning process. The reports may be displayed on a monitor or printed and can be generated in near real-time as provisioning is ongoing.

Additional aspects of the invention are described in detail below.

BRIEF DESCRIPTION OF THE DRAWINGS

Other features of the invention will be further apparent from the following detailed description of presently preferred exemplary embodiments of the invention taken in conjunction with the accompanying drawings, of which:

FIGS. 5A through 5D are exemplary screens that may be generated by a system in accordance with the invention.

DETAILED DESCRIPTION OF THE INVENTION

Figure 1:
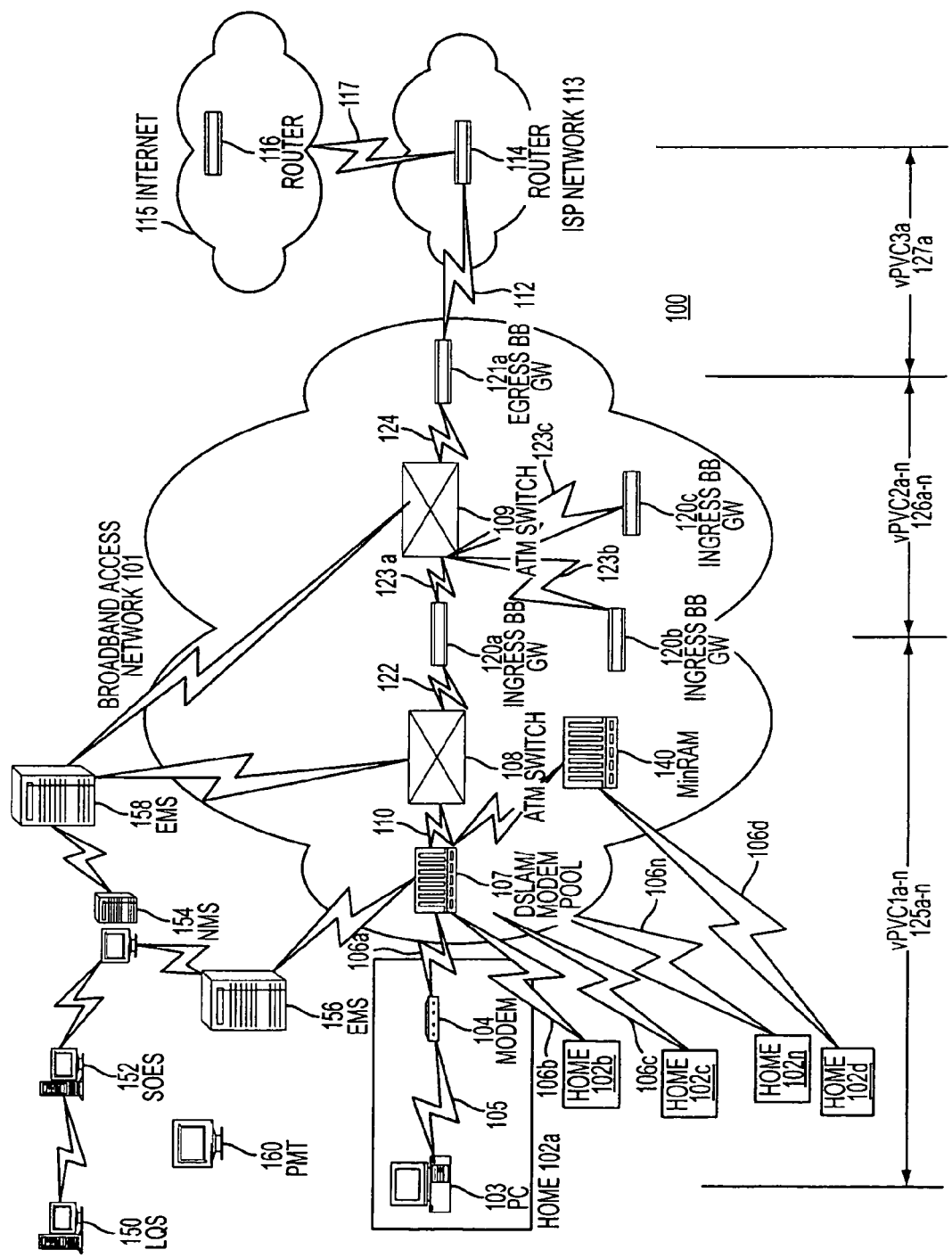
FIG. 1 is a high level diagram of an exemplary DSL network.

Systems and methods with the above-mentioned beneficial features in accordance with a presently preferred exemplary embodiment of the invention will be described below with reference to FIGS. 1–5. It will be appreciated by those of ordinary skill in the art that the description given herein with respect to those figures is for exemplary purposes only and is not intended in any way to limit the scope of the invention. All questions regarding the scope of the invention may be resolved by referring to the appended claims.

Generally, applicants have invented systems and methods for automated troubleshooting of DSL provisioning. The disclosed systems and methods are operable to monitor the provisioning of DSL services, generate reports regarding provisioning, and when an unexpected delay is detected in the provisioning process, generate an alert. A PMT queries machines in the DSL network that either need to be configured or are responsible for managing the provisioning process. Using the query results, the PMT can generate reports and a near real time GUI to display data concerning the provisioning process. If the time associated with provisioning of a service request exceeds a prescribed threshold, the PMT indicates this in the report and may issue an alert.

Prior to explaining details of an illustrative embodiment of the invention, it is useful to provide a description of a suitable DSL network environment in which the invention may be implemented.

Exemplary DSL Network Environment

1. Exemplary DSL Network

Digital Subscriber Line (DSL) is a technology that converts existing twisted-pair telephone lines into access paths for multimedia and high-speed data communications. DSL services promise to dramatically increase the speed of copper wire based transmission systems without requiring expensive upgrades to the local loop infrastructure. As used herein, xDSL refers to the numerous variations of DSL technology using the Bellcore acronyms such as ADSL (Asymmetric DSL), HDSL (high bit-rate DSL), RADSL (rate-adaptive DSL), and the like. New and improved versions of xDSL are in constant development and the invention is not intended to be limited to any single variation of the technology.

Most xDSL signals fall within the frequency range of 4 KHz to 2.2 MHz, with the range of 0 to 4 KHz reserved for the transmission of analog voice signals for plain old telephone service (POTS). The theoretical maximum amount of bandwidth between 4 KHz and 2.2 MHz is almost 70 Mbps of digital data spectrum. In practice however, only lab test conditions have ever reached higher than 60 Mbps and currently available products typically use 2 Mbps to 8 Mbps.

The different types of xDSL technologies may also be categorized as either symmetric EC xDSL or asymmetric (FDM) xDSL. A first class of EC xDSL includes Integrated Services Digital Network (ISDN), High-Bit-Rate DSL (HDSL), and Single-Line DSL (SDSL). A second class of EC xDSL includes Asymmetric DSL (ADSL) and Rate Adaptive DSL (RADSL). The modulation technologies employed with the various types of xDSL include 2-binary 1-quaternary (2B1Q) for ISDN and HDSL, carrierless amplitude phase modulation (CAP) for HDSL, SDSL and RADSL, and discrete multi-tone modulation (DMT) for ADSL and RADSL.

Generally, DMT divides the upstream and downstream bands into smaller individual or discrete bands. The modems on either end listen to these discrete bands as smaller channels within the main upstream or downstream channel. Often, one of these smaller bands will be disrupted by noise, rendering the information carried within that band useless. Rather than toss away all the information sent at that instant across the entire upstream or downstream band, only that small part is lost and needs to be retransmitted.

With CAP, the overall amplitude or power of the signal is modulated. The signal is not safeguarded against noise and often suffers from lost information, which accounts in part for the lower transmission speeds of CAP-based DSL technologies. With amplitude modulation, there is also more loss over longer ranges. The benefits of CAP over DMT are that it is simpler in design and therefore cheaper, requires less power, and generates less heat. Both power consumption and heat are serious factors when it comes to housing many of these systems together (as in a central office). DMT however, often provides the best results and maintains the full bandwidth at its maximum range of 18,000 feet. CAP signals degrade quickly after 10,000 feet.

Typical xDSL systems are implemented as follows. At the customer premises a splitter is provided which separates the xDSL signals (i.e., digital data signals) from the POTS analog voice signals. The main purpose of the splitter is to shield ordinary telephones from the high frequency xDSL signals that can have disastrous effects on the telephone or human ear. The data line from the splitter connects to an xDSL modem and the analog line connects to the telephone. With xDSL Lite and some other product models, there is an external splitter or it is combined into the xDSL modem unit. An Ethernet line will usually link the xDSL modem to the customer premises PC.

The twisted pair from the customer premises connects to an xDSL access multiplexor such as, for example a DSLAM, typically located at the incumbent local exchange carrier (ILEC) central office (CO) and/or a remote terminal. The twisted pair from the customer premise may also pass through a neighborhood wiring distribution frame, which is a central point where the wire pairs from several customer premises come together, and/or an ILEC remote terminal before reaching the CO. Typically, a DSLAM is a multimodule unit that houses many CO-side xDSL modems within a single shelf much like the analog modem racks of today. At the DSLAM the voice and data lines are split out along separate paths. The digital data signal goes into either an ATM concentrator or an Internet Protocol router. The analog voice signals are connected to the CO phone switch.

Thus, the digital data packets go through the router out to the Internet, and the analog voice signals go through the phone switch and into the public switched telephone network.

ADSL is one particularly promising and popular form of xDSL. ADSL can transmit up to 6 Mbps to a subscriber, and as much as 832 kbps or more in both the downstream and upstream directions. Such rates expand existing access capacity by a factor of 50 or more without the need to install new wiring or cabling. An ADSL circuit connects an ADSL modem on each end of a twisted-pair telephone line, creating three information channels—a high speed downstream channel, a medium speed duplex channel, depending on the implementation of the ADSL architecture, and a POTS or ISDN channel. The POTS/ISDN channel is split off from the digital modem by filters, thus guaranteeing uninterrupted POTS/ISDN, even if ADSL fails. The high speed channel ranges from 1.5 to 6.1 Mbps, while duplex rates range from 16 to 832 kbps. Each channel can be submultiplexed to form multiple, lower rate channels, depending on the system.

ADSL modems provide data rates consistent with North American and European digital hierarchies and can be purchased with various speed ranges and capabilities. The minimum configuration provides 1.5 or 2.0 Mbps downstream and a 16 kbps duplex channel; others provide rates of 6.1 Mbps and 64 kbps duplex. Products with downstream rates up to 8 Mbps and duplex rates up to 640 kbps are currently available. ADSL modems also can accommodate ATM transport with variable rates and compensation for ATM overhead, as well as IP protocols. Downstream data rates depend on a number of factors, including the length of the copper line, its wire gauge, presence of bridged taps, and cross-coupled interference. Line attenuation increases with line length and frequency, and decreases as wire diameter increases.

FIG. 1 shows an exemplary ADSL based broadband access network 100. In order for an IP enabled device such as, for example, personal computer 103 in home 102a, to establish a service session with a source on Internet 115, the IP enabled device first establishes an access session with an Open Systems Interconnection (OSI) model layer 2/3 communications element such as, for example, router 114, in an Internet service provider (ISP) network (e.g., ISP network 113) through an asynchronous transfer mode (ATM) based broadband access network (e.g., broadband access network 101) with a broadband access device (e.g., DSL modem 104) connected to the local loop (e.g., link 106a). As shown, the connection from home 102 to network 101 is through DSLAM 107 or MiniRAM 140. An IP client (not shown) on the IP enabled device secures an IP address from the ISP using Dynamic Host Configuration Protocol (DHCP) from a DHCP server (not shown) in communication with the ISP's router. The DHCP server temporarily allocates or leases a unique IP address to the IP client. The IP client may thereafter obtain IP based services available on the ISP network and beyond by sending and receiving packets to and from the ISP's router through the broadband access network. Sources on the Internet 115 are reached by utilizing a communications link between the ISP network and the Internet 115 (e.g., communications link 117).

In addition to the layer 2 communications elements (e.g., asynchronous transfer mode (ATM) switches 108 and 109), layer 2/3 communications elements also form a part of broadband access network 101. Specifically, a plurality of layer 2/3 communications elements (e.g., ingress broadband gateways 120a–n) reside after various layer 2 communications elements (e.g., ATM Switch 108) lying near ingress points for access device IP traffic (e.g., IP traffic from personal computer 103), and a plurality of layer 2/3 communications elements (e.g., egress broadband gateway 121a) reside after layer 2 communications elements (e.g., ATM Switch 109) lying near egress points for access device IP traffic destined for ISP networks (e.g., ISP network 113) linked to broadband access network 101. In exemplary network 100, ATM switch 108 may comprise, for example, a Lucent CBX 500 multiservice WAN switch, and ATM switch 109 may comprise, for example, a Lucent GX 550 multiservice WAN switch. Ingress and egress broadband gateways 120, 121 comprise, for example, Nortel 5000 Broadband Service Nodes.

Each of the layer 2/3 communications elements in broadband access network 101 supports the creation of layer 3 communications sessions between various communications elements within and without network 101 using layer 3 protocols such as IP. The layer 2/3 communications elements also support the creation of virtual layer 2 communications sessions or "virtual PVCs(vPVCs)" using one or more of the following protocols: Point-to-Point Protocol (PPP) over Ethernet (PPPoE), PPP over ATM (PPPoA), Layer 2 Tunneling Protocol (L2TP), Point-to-Point Tunneling Protocol (PPTP), and/or Switched Multimegabit Data Service (SMDS) Interface Protocol (SIP). A PVC is a "permanent" virtual circuit and provides an "always on" connection whether the subscribers is actively using it or not. Thus, a series of three layer 2 virtual PVCs (e.g., vPVC1a 125a, vPVC2a 126a, and vPVC3a 127a) extend from an access device (e.g., ADSL modem 104) to an ISP (e.g., ISP network 113) through broadband access network 101 (versus having a single layer 2 PVC extending from an access device to an ISP as in other broadband access networks).

The first layer 2 vPVC (e.g., vPVC1a 125a) extends from an access device (e.g., ADSL modem 103) to one of the ingress layer 2/3 communications elements (e.g., ingress broadband gateway 120a), and is the only vPVC devoted exclusively to a single IP subscriber. Typically the first layer 2 vPVC is a user authenticated PPP session. In one embodiment of the network 101 the first layer 2 vPVC is a user authenticated PPPoE session where the IP enabled device (or the operator thereof) supplies a username and domain (e.g., "user1@domain1"). Based on the domain provided, the first layer 2/3 communications element establishes a virtual layer 2 connection using L2TP over the remaining two layer 2 vPVCs to reach the appropriate ISP and the ISP provides the IP enabled device an IP address for obtaining IP based services. This model allows for the creation of access sessions with different ISPs depending on the domain provided by the IP enabled device. This model also allows IP services to be billed to a particular user on a per access session basis.

The second vPVC (e.g., vPVC2a 126a) extends from the foregoing ingress layer 2/3 communications element (e.g., Ingress Broadband Gateway 120a) to one of the egress layer 2/3 communications elements (e.g., Egress Broadband Gateway 121a). Through the use of a tunneling protocol such as L2TP, PPP aggregation occurs at the layer 2/3 ingress communications element and the multiple PPP communications sessions between access devices (e.g., access devices in homes 102b–n) served by the ingress layer 2/3 communications element are funneled into the second vPVC. The third vPVC (e.g., vPVC3a 127a) extends from the foregoing egress layer 2/3 communications element (e.g., Egress Broadband Gateway 121a) to the layer 2/3 communications element in the ISP network. In this embodiment of the invention the layer 2/3 communications element in the ISP network is an LNS capable router (e.g., layer 2/3 communications element 114). Again, through the use of a tunneling protocol such as L2TP, PPP aggregation occurs at the egress layer 2/3 communications element and the multiple PPP communications sessions from multiple L2TP IBG tunnels are concentrated onto a single L2TP tunnel by the egress broadband gateway and are funneled into the third virtual PVC. The third virtual PVC delivers a large (doubly aggregated) L2TP tunnel to the LNS router 114 where the PPP sessions are terminated and IP packets are once again routed normally.

DSL network 100 further comprises Loop Qualification System (LQS) 150, Service Order Entry Gateway (SOEG) 152, Network Management System (NMS) 154, and Element Management Systems 156, 158. LQS 150 operates to determine whether, due to network and geographical restraints, DSL service can be made available to the requester. Once it has been determined that DSL service can be made available to a particular location, SOEG 152 is a gateway for wholesale customers and operates to format service orders for processing by the NMS. NMS 156 coordinates the operation of nodes, elements, objects, cards, physical links, equipment, and the like, within network 100 and, as explained below in connection with FIG. 2, coordinates the configuration of network elements to establish PVC's/tunnels from end users through the DSL network to ISP's. EMS's 156, 158 comprise intermediaries between NMS 154 and the broadband network elements including DSLAMs 107a–n, MiniRAMs 140a–n, and ATM switches 108, 109. EMS's interpret messages, such as simple network management protocol (SNMP) messages, to and from nodes in network management system 201. In one embodiment, communication between the NMS 154 and the EMSs 156a–m is via X.25, serial, TCP/IP, or UDP/IP connection while communication between the EMSs 156a–m and the DSLAMs 107a–n is via SNMP over UDP/IP, TL1, etc.

Figure 4:
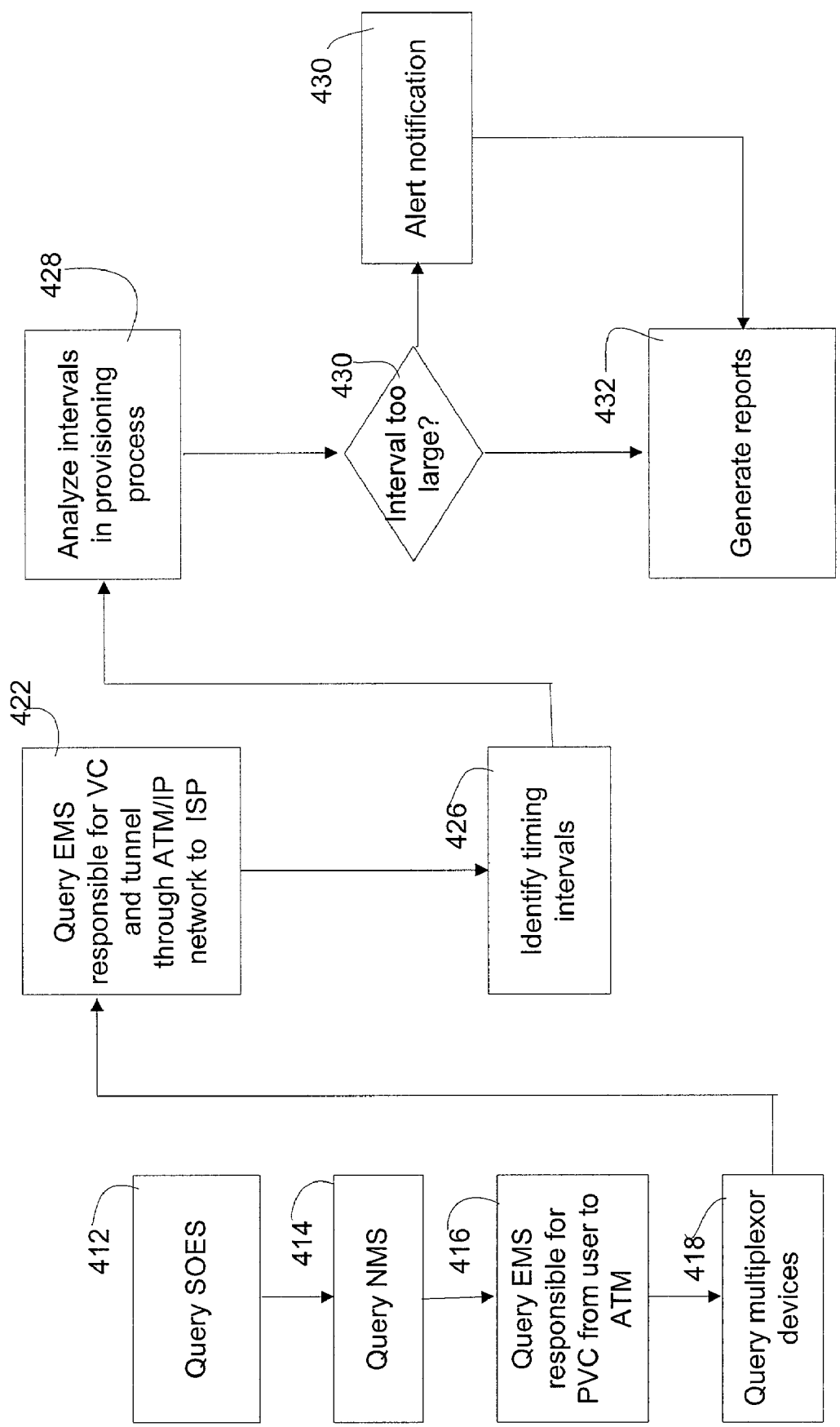
FIG. 4 is a flow diagram of a process for automatically monitoring DSL provisioning.

DSL network 100 further comprises provisioning monitoring tool (PMT) 160, which as described below in connection with FIG. 4, is operable to collect data regarding provisioning from the various network elements including LQS 150, SOES 152, NMS 154, EMS's 156 and 158, and DSLAMs 107a–n. Using this data, PMT 160 generates reports regarding the provisioning process and monitors for unacceptable delays.

In an illustrative embodiment of system 100, NMS 154 comprises, for example, an Alcatel 5620 Network Manager, EMS 156 comprises, for example, Alcatel 5526 Access Management Systems, DSLAMs 107a–n comprise, for example, Alcatel 7300 DSL Subscriber Access Platform, and MinRAMs comprise, for example, Alcatel and ECI equipment. As described in connection with FIG. 3, PMT 160 is a personal computer or similar computing device.

2. Exemplary Process for Provisioning in DSL Network

Figure 2:
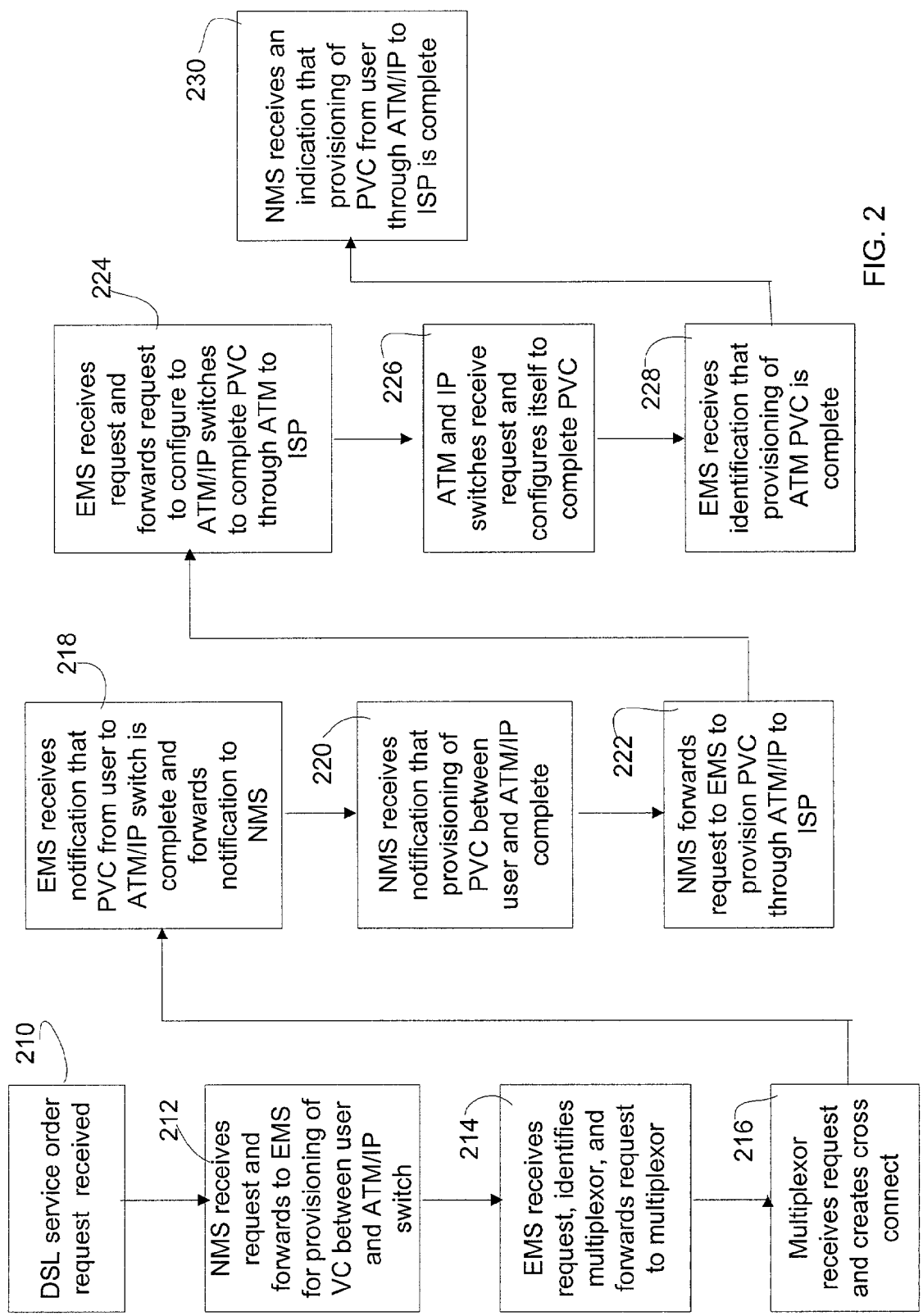
FIG. 2 is a flow chart of a process for provisioning DSL services.

A flow chart illustrating an illustrative process for provisioning DSL services is depicted in FIG. 2. As shown, at step 210, a request for DSL service is received into the service provider's network. In the exemplary network of FIG. 1, this step comprises receiving the request and gathering information from LQS 150 where it is determined whether DSL service can be provided at the desired location. If so, the requestor's information enters SOEG 152, which forwards the request to NMS 154.

At step 212, NMS 154 logs the request for DSL service and determines which network elements need configuration in order to provide the requested service. NMS 154 comprises a database identifying the network composition at both a physical and logical level. For example, NMS 154 comprises data identifying hardware such as switches and card ports, but also includes information regarding logical network elements such as VC's and tunnels. Upon identifying the network elements and assignments needed for configuration, NMS 154 forwards a request to the EMS(s) 156 that are dedicated to managing the network elements that need configuration. For example, NMS 154 forwards a request to the EMS(s) 156 responsible for managing the network elements through which the PVC is established from the end user to ATM switch 108. NMS 154 uses the inventory information gained from previous provisioning and during the discovery process to send a request to the EMS or particular network element. At step 214, EMS 156 receives the request, identifies the particular multiplexor that needs to be configured to implement the desired PVC, which may be multiplexor 107 for example, and forwards a command with configuration information to the multiplexor. EMS 156 may issue commands to various interfaces such as, for example, sockets, CORBA, RMI, etc., using various different protocols such as, for example, CORBA calls, SNMP, TL1, etc. At step 216, multiplexor 107 receives the configuration command and creates a cross connect in its switching fabric in accordance with the command. Those skilled in the art will recognize that step 216 may further comprise configuring other devices such as for example minRAM 140, or other DSLAM's in order to establish a portion of the PVC from the end user to ATM switch 108.

At step 218, EMS 156 receives notification from multiplexor 107 that the PVC has been created from the end user to ATM switch 108 and forwards notification of such to NMS 154. At step 220, NMS 154 receives the notification and at step 222 forwards a request to EMS 158 to complete the PVC through the ATM network to ISP 113. Devices configured are two ATM switches through the cloud, potentially two ATM/IP aggregate switches into the ATM cloud and different EMS for providing connectivity to the customer and NSP/ISP.

At step 224, EMS 158 receives the request and forwards a configuration command to ATM switches 108 and 109. At step 226, ATM switches 108 and 109 receive the configuration command and configure themselves accordingly to establish the portion of the PVC through the ATM network out to ISP 113. At step 226, EMS 158 receives notification that the PVC through the ATM network is complete and forwards this information to NMS 154 at step 230.

Those skilled in the art recognize that at each network element involved in the provisioning process, information is gathered regarding the actions that are taken. For example, SOEG 152, NMS 154, EMS 156, EMS 158, DSLAM 107, and ATM switches 108 and 109 gather and store information identifying the actions each takes and the DSL service to which the actions are associated. The DSL network elements log the time that requests for provisioning are received at each element, the actions taken, and the time when the actions are completed. The information collected by the network elements is used by PMT 158 as explained in connection with FIG. 4 to monitor the provisioning process.

Automated Monitoring of DSL Provisioning

PMT 158 is operable to communicate with SOEG 152, NMS 154, EMS 156, DSLAM's 107, MinRAM's 140, and any other network element that may be involved in the provisioning of DSL services. Specifically, PMT 158 queries the network elements that cooperate to provision DSL services for the information regarding the actions that were taken by each network element to provision services and the times those actions were taken. PMT 158 retrieves the data and stores it in a database. Furthermore, PMT 158 generates reports in real time detailing the data related to the provisioning process and monitors the data for indications that there may be an unacceptable delay in the provisioning process.

Figure 3:
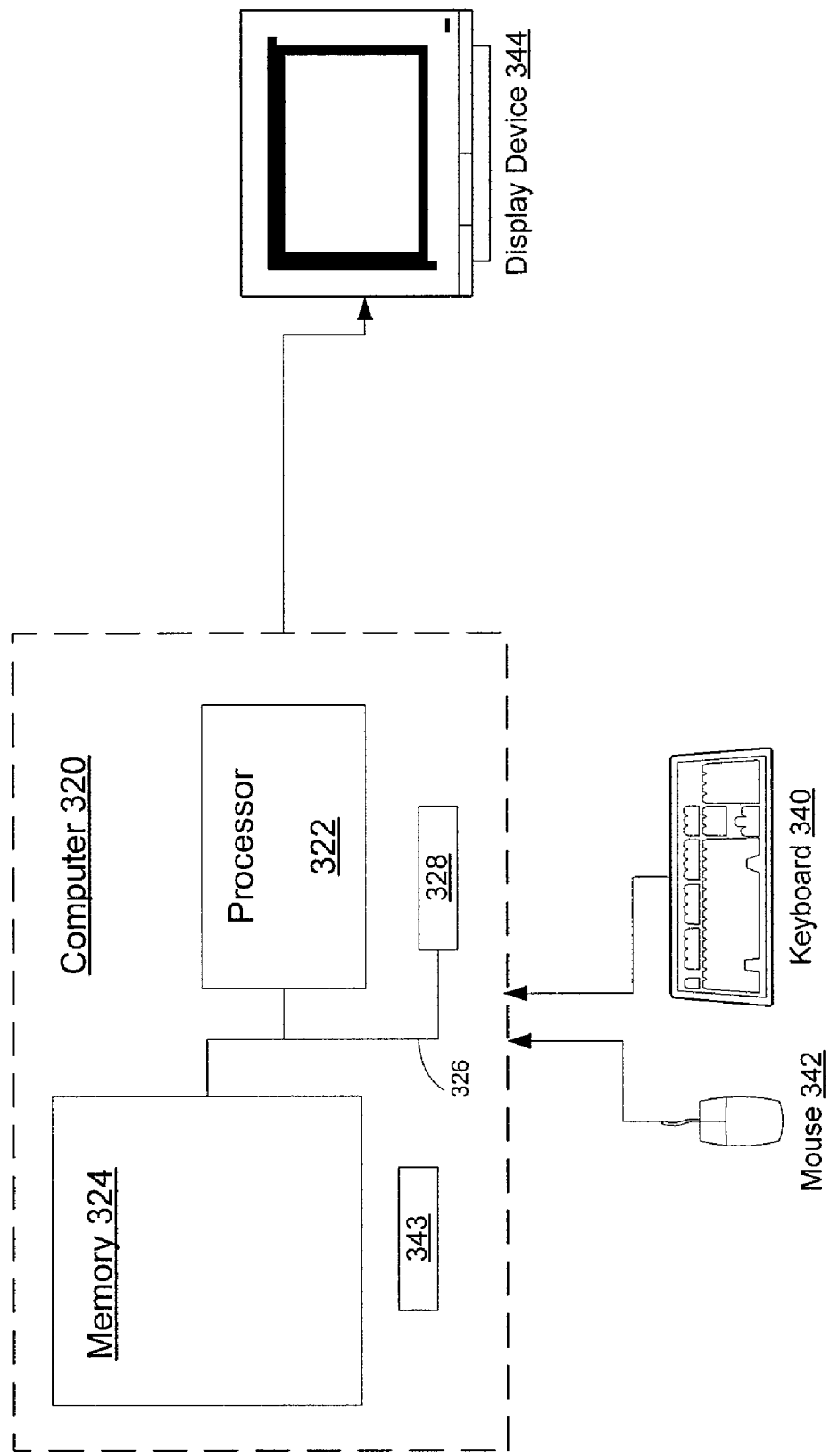
FIG. 3 is a block diagram of a computing device for use in a system in accordance with an aspect of the invention.

PMT 158 may be implemented on a generic computing system such as is shown in FIG. 3. As shown, computing device 320 includes processing unit 322, system memory 324, and system bus 326 that couples various system components including system memory 324 to the processing unit 322. The system memory 324 might include read-only memory (ROM) and random access memory (RAM). The system might further include hard-drive 328, which provides storage for computer readable instructions, data structures, program modules and other data. A user may enter commands and information into the computer 320 through input devices such as a keyboard 340 and pointing device 342. A monitor 344 or other type of display device is also connected to the system for output. Communications device 343, which may be for example a TCP/IP enable device, provides for communications in system 200. Processor 322 can be programmed with instructions to interact with other computing systems so as to perform the algorithms described below with reference to FIG. 4. The instructions may be received from network 200 or stored in memory 324 and/or hard drive 328. Processor 322 may be loaded with any one of several computer operating systems such as Windows NT, Windows 2000, or Linux. Those skilled in the art recognize that while PMT 210 is illustrated as a desktop computing system, other computing devices such as for example, laptop and handheld computing devices might alternatively be employed.

FIG. 4 provides a flow diagram of an illustrative process for automatically monitoring provisioning in a DSL network in accordance with an aspect of the invention. At step 412, PMT queries SOEG 152 for information identifying for each service request, when the request was received at SOEG 152 and when a request for provisioning of the service was forwarded to NMS 154. In the exemplary embodiment, requests for service are identified by the DSL telephone number where the XDSL service is being provisioned.

At step 414, PMT queries NMS 154 for information identifying for each service request, when the request was received at the NMS 154, what action the NMS 154 took in response to the request, and when the action was taken.

At step 416, PMT queries EMS 156 for information identifying for each service request for which provisioning is requested at EMS 156, when the request was received at EMS 156, what action EMS 156 took in response to the request, and when the action was taken.

At step 418, PMT queries any multiplexor devices such as, for example, DSLAM 107 and MiniRAM 140, that may need to be configured to establish a PVC from an end user to an ATM switch. Specifically, PMT 158 queries the multiplexor devices for information identifying for each service request for which provisioning was requested, when the request was received, what action the multiplexor took in response to the request, and when the action was taken.

At step 420, PMT queries EMS 158 for information identifying for each service request for which provisioning was requested, when the request was received at EMS 158, what action EMS 158 took in response to the request, and when the action was taken. For example, PMT may query EMS 158 for information regarding the cross connects that were formed.

At step 424, PMT uses the information gathered at steps 410 through 422 to calculate statistics such as, for example, timing intervals in the provisioning process, i.e. how long it took to perform various actions in the provisioning process. For example, PMT 158 calculates for each DSL service request, the interval for NMS 154 to receive the request and forward a corresponding request to EMS 156 to establish part of the PVC from an end user to an AMT network. Indeed, time intervals are calculated for all important actions in the provisioning process including additions, deletions and modifications. Furthermore, statistics, such as averages, are calculated for the timing intervals.

At step 426, PMT 158 analyzes the statistics calculated at step 424 to determine whether there has been an unacceptable delay or failure in the provisioning process. For example, PMT 158 compares intervals associated with performing provisioning acts to predetermined threshold values, which are established by an administrator. If at step 428, the intervals are too large, i.e. it appears to have taken too long to complete an action, at step 430 an alert notification is created. The alert notification may comprise an e-mail or page forwarded to an administrator, a dialog box that appears on the PMT 158 monitor, or an anomaly that appears in a trending graph displayed on the PMT 158 monitor.

At step 432, PMT 158 generates reports from the data gathered at steps 410 through 422. Reports are made available that trace the provisioning of individual DSL service requests, which are usually identified by the DSL phone number that is being provisioned, from the time the requests were entered into the system through to when the provisioning process was completed. If the time associated with provisioning at one of the network elements exceeds a prescribed period, the PMT indicates this in the report. The reports may show aggregated provisioning information and/or information for a single service request. For example, reports are provided showing average provisioning times, average provisioning times at particular network elements, and average provisioning times between elements in the provisioning process. The reports may be displayed on a monitor or printed and can be generated in near real-time as the provisioning is ongoing.

Figure 5A:
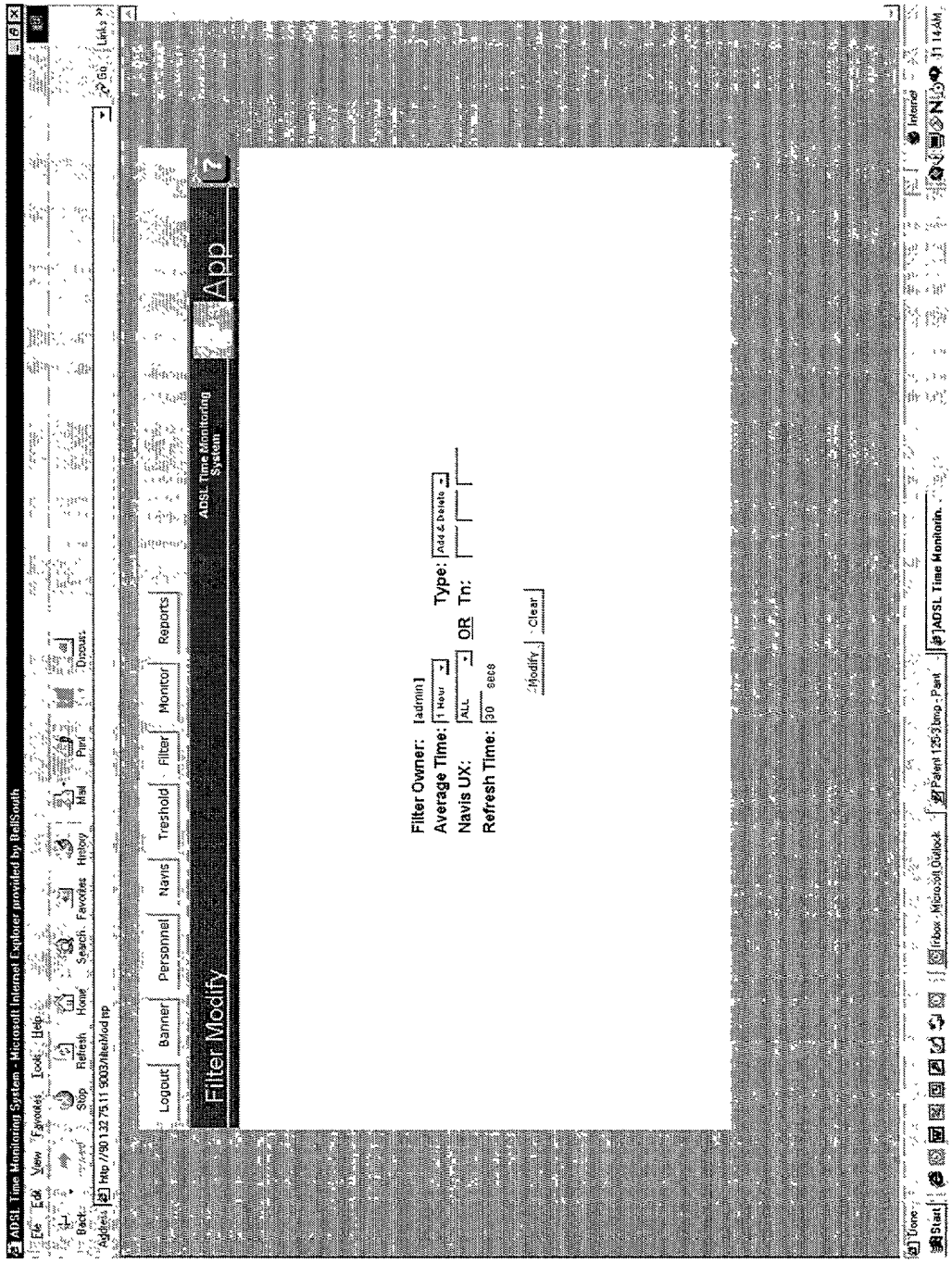
Figure 5C:
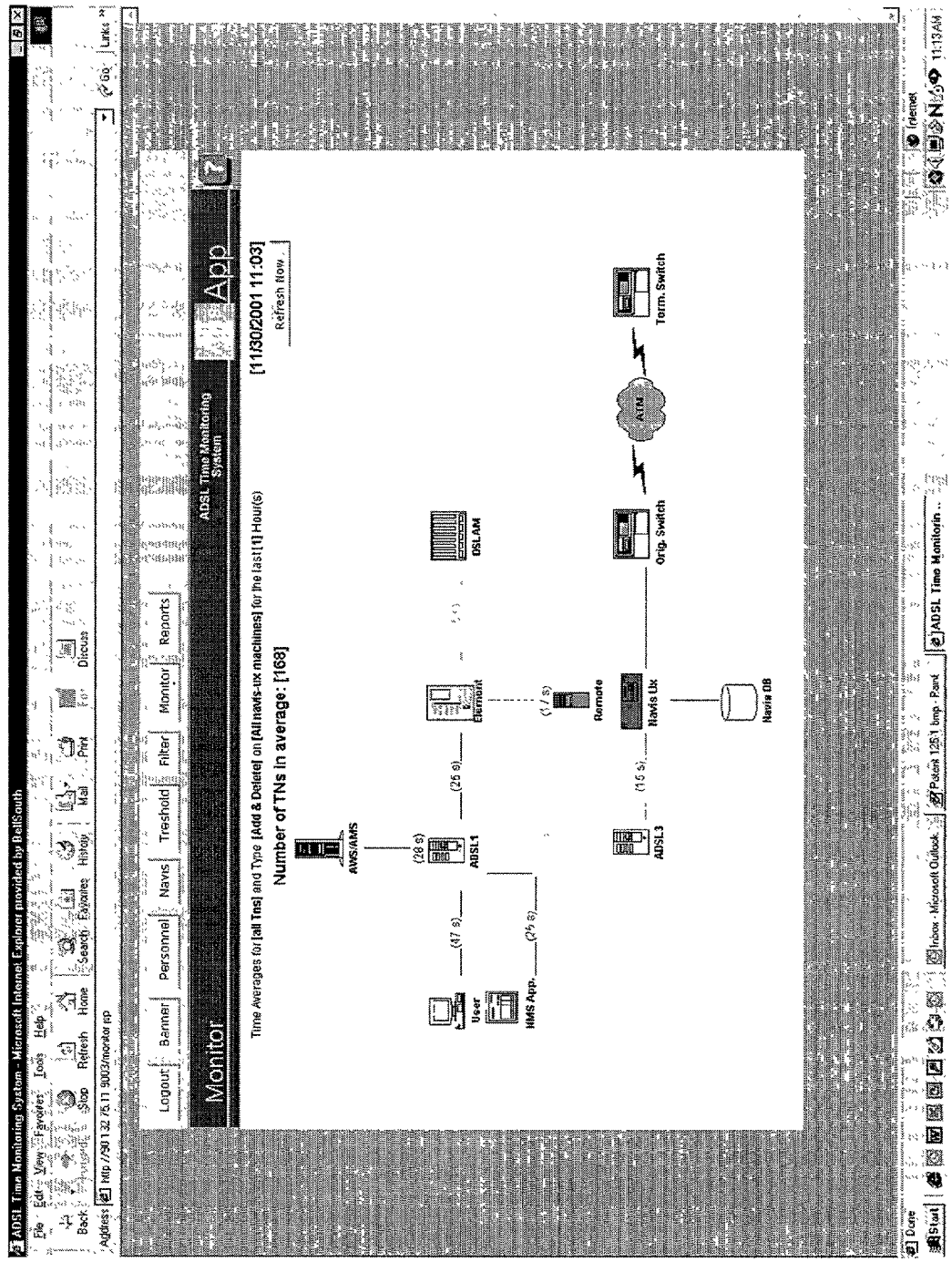
Figure 5D:
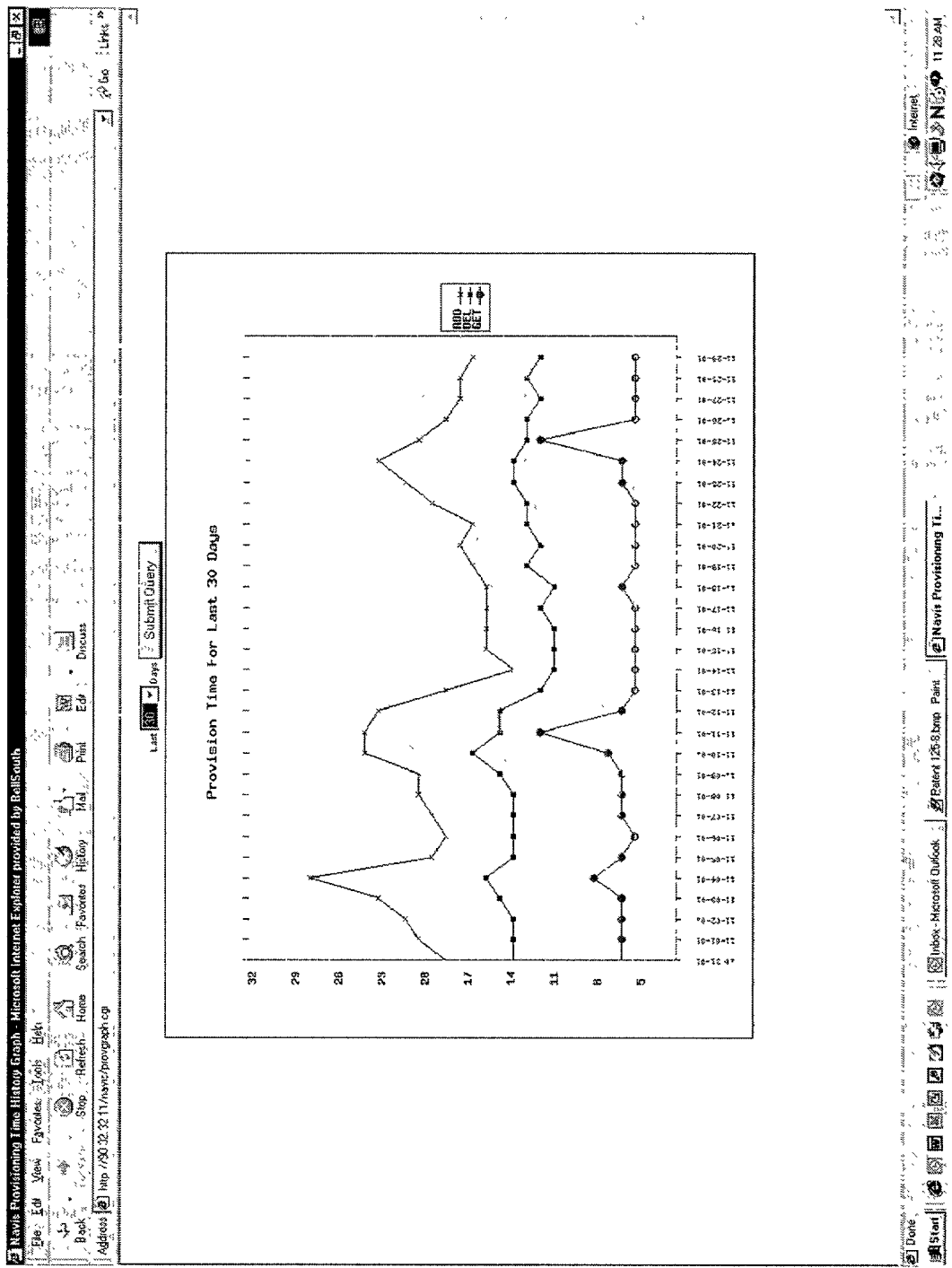

FIGS. 5A through 5D are exemplary screens for creating and viewing reports that may be generated by a system in accordance with the invention. FIG. 5A is a filter screen that may be used to query for specific types of data that have been gathered by the system. FIGS. 5B through 5D are report screens for displaying data related to provisioning. As shown, reports may be generated that detail almost any aspect of the provisioning process.

Thus, systems and methods for automatically monitoring DSL provisioning have been disclosed. These novel systems and methods allow administrators to automatically identify delays and failures in the provisioning process. The automated reporting feature allows administers to view the status of the provisioning process and quickly identify the source of problems. Automatic monitoring of the DSL provisioning process greatly simplifies administration of the DSL network and facilitates quick, efficient, and reliable provisioning of DSL services to customers.

Those skilled in the art understand that computer readable instructions for implementing the above-described processes, such as those described with reference to FIG. 4, can be generated and stored on one of a plurality of computer readable media such as a magnetic disk or CD-ROM. Further, a general purpose computer such as that described with reference to FIG. 3 may be arranged with other similarly equipped computers in a network, and may be loaded with computer readable instructions for performing the above described processes. Specifically, referring to FIG.

3, microprocessor 322 may be programmed to operate in accordance with the above-described processes.

While the invention has been described and illustrated with reference to specific embodiments, those skilled in the art will recognize that modification and variations may be made without departing from the principles of the invention as described above and set forth in the following claims. For example, while the invention has been described in connection with querying DSLAM's, MiniRAM's, and ATM switches, the systems and methods may be employed to query and monitor the status of provisioning at other DSL devices as well. Accordingly, reference should be made to the appended claims as indicating the scope of the invention.

What is claimed is:

1. A method for monitoring provisioning of DSL services, comprising the following steps:
    querying DSL network elements for information relating to provisioning DSL services;
    processing the information relating to provisioning DSL services to identify delays in provisioning DSL services; and
    reporting a delay.

2. The method of claim 1, wherein the step of querying DSL network elements for information relating to provisioning DSL services comprises requesting information from at least one of a network management system, an element management system, and DSL multiplexor.

3. The method of claim 1, wherein the step of querying DSL network elements for information relating to provisioning DSL services comprises querying for information relating to the timing of acts performed in provisioning DSL services.

4. The method of claim 1, wherein processing the information relating to provisioning DSL services to identify delays in provisioning DSL services, comprises calculating the time required to perform acts associated with provisioning DSL services.

5. The method of claim 1, wherein reporting a delay comprises forwarding an e-mail.

6. The method of claim 1, further comprising generating a report identifying the time required to perform acts associated with provisioning DSL services.

7. The method of claim 6, wherein generating a report identifying the time required to perform acts associated with provisioning DSL services comprises displaying statistics on a monitor, wherein the statistics specify the time required to perform acts associated with provisioning DSL services.

8. The method of claim 1, wherein the step of querying DSL network elements for information associated with provisioning DSL services comprises querying for at least one of the following: data indicating the time a request to make a cross connect was received at a multiplexor; data indicating the time a cross connect was made in a multiplexor; data indicating the time a request to provision a DSL service was received at an EMS; data indicating the time an EMS completed responding to a request to provision a DSL service; data indicating the time an action was taken by an EMS in response to a request to provision a DSL service; data indicating the time a request to establish a cross connect was received at an ATM switch; data indicating the time a cross connect was completed at an ATM switch; data indicating the time a request to provision a DSL service was received at an NMS; data indicating the time an action was taken by an NMS in response to a request to provision a DSL service; and data indicating the time a request to provision a DSL service was completed at an NMS.

9. A computer readable medium having computer executable instructions thereon for performing the following steps:
    querying DSL network elements for information relating to provisioning DSL services;
    processing the information relating to provisioning DSL services to identify delays in provisioning DSL services; and
    reporting a delay.

10. The computer readable medium of claim 9, wherein the instructions for querying DSL network elements for information relating to provisioning DSL services, comprise instructions for requesting information from at least one of a network management system, an element management system, and DSL multiplexor.

11. The computer readable medium of claim 9, wherein the instructions for querying DSL network elements for information relating to provisioning DSL services comprises instructions for querying for information relating to the timing of acts performed in provisioning DSL services.

12. The computer readable medium of claim 9, wherein the instructions for processing the information relating to provisioning DSL services to identify delays in provisioning DSL services, comprises instructions for calculating the time required to perform acts associated with provisioning DSL services.

13. The computer readable medium of claim 9, wherein the instructions for reporting a delay comprise instructions for forwarding an e-mail.

14. The computer readable medium of claim 9, further comprising computer executable instructions for generating a report identifying the time required to perform acts associated with provisioning DSL services.

15. A system for monitoring provisioning of DSL services, comprising:
    a processor for executing computer executable instructions; and
    memory for storing computer executable instructions, wherein said memory has stored therein computer executable instructions for performing the following steps:
    querying DSL network elements for information relating to provisioning DSL services;
    processing the information relating to provisioning DSL services to identify delays in provisioning DSL services; and
    reporting a delay.

16. The system of claim 15, wherein the instructions for querying DSL network elements for information relating to provisioning DSL services, comprise instructions for requesting information from at least one of a network management system, an element management system, and DSL multiplexor.

17. The system of claim 15, wherein the instructions for querying DSL network elements for information relating to provisioning DSL services comprises instructions for querying for information relating to the timing of acts performed in provisioning DSL services.

18. The system of claim 15, wherein the instructions for processing the information relating to provisioning DSL services to identify delays in provisioning DSL services, comprises instructions for calculating the time required to perform acts associated with provisioning DSL services.

19. The system of claim 15, wherein the instructions for reporting a delay comprise instructions for forwarding an e-mail.

20. The system of claim 15, wherein said memory has further stored thereon computer executable instructions for generating a report identifying the time required to perform acts associated with provisioning DSL services.

21. The method of claim 1, wherein said information relating to provisioning DSL services further comprises information relating to one of routing an order for DSL service and configuring network elements to create a permanent virtual circuit.

22. The computer readable medium of claim 9, wherein said information relating to provisioning DSL services further comprises information relating to one of routing an order for DSL service and configuring network elements to create a permanent virtual circuit.

23. The system of claim 15, wherein said information relating to provisioning DSL services further comprises information relating to one of routing an order for DSL service and configuring network elements to create a permanent virtual circuit.

* * * * *